United States Patent [19]
Borcherding

[11] 3,726,026
[45] Apr. 10, 1973

[54] MAGNETIC EDUCATIONAL TOY
[75] Inventor: Elsa Borcherding, Whittier, Calif.
[73] Assignee: The Raymond Lee Organization, Inc., New York, N.Y.
[22] Filed: Nov. 17, 1971
[21] Appl. No.: 199,616

[52] U.S. Cl..................35/62, 35/7 A, 40/142 A
[51] Int. Cl..............................................G09b 1/08
[58] Field of Search..............35/7 A, 60, 62, 66; 40/142 A; 335/302, 304, 306

[56] References Cited
UNITED STATES PATENTS

| | | | |
|---|---|---|---|
| 1,677,919 | 7/1928 | Hansen | 35/7 A UX |
| 2,600,505 | 6/1952 | Jones | 35/7 A UX |
| 3,126,645 | 3/1964 | Lloyd | 40/142 A X |

Primary Examiner—Harland S. Skogquist
Attorney—Howard I. Podell

[57] ABSTRACT

An educational toy for young children consisting of a magnetized board in which objects may be fastened which are cut-out in the shape of characters of childrens' stories or cut-out in the shape of animals, etc. The magnetic board is fabricated of a non-metal base in which iron wires terminating in magnets are embedded. The objects to be fastened to the board may be fabricated of a soft steel, or of non-magnetic material with embedded bits of soft iron or steel.

6 Claims, 6 Drawing Figures

PATENTED APR 10 1973  3,726,026

INVENTOR.
ELSA BORCHERDING
BY Howard L. Podell
ATTORNEY

MAGNETIC EDUCATIONAL TOY

SUMMARY OF THE INVENTION

This invention relates to a means to display visual objects on a display board, and particularly to means to display cut-outs of characters on the face of toys and educational apparatus, for use by small children.

The apparatus consists of a non-metallic board, which may be fastened to a table or blackboard stand and in which is embedded parallel iron wires terminating in the poles of embedded magnets in the order of the board. Adjacent embedded wires are attached to opposite magnetic poles to that the board will magnetically attract and hold lightweight objects which have a backing of iron or soft steel.

BRIEF DESCRIPTION OF THE DRAWING

The objects and features of the invention may be readily understood with reference to the following detailed description of an illustrative embodiment of the invention taken together with the accompanying drawing in which.

DESCRIPTION OF THE PREFERRED EMBODIMENT

Figure 1:
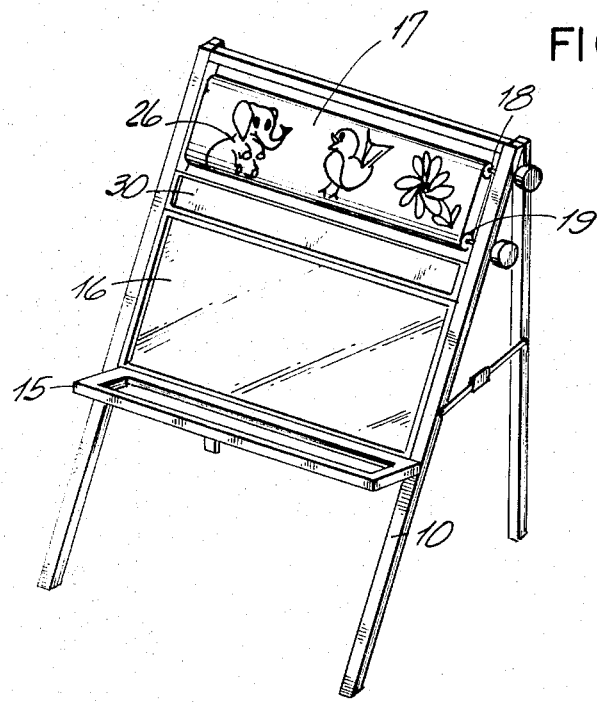
FIG. 1 is a perspective illustration of a backboard unit incorporating the invention.

Turning now descriptively to the drawings, in which similar reference characters denote similar elements throughout the several views, FIG. 1 illustrates the magnetic board 30 mounted vertically on a folding stand 10 which contains a blackboard 16 and an illustrated screen 17, with drawings 26 of animal characters displayed on screen 17. Screen 17 is mounted on rollers 18 and 19.

Figure 2:
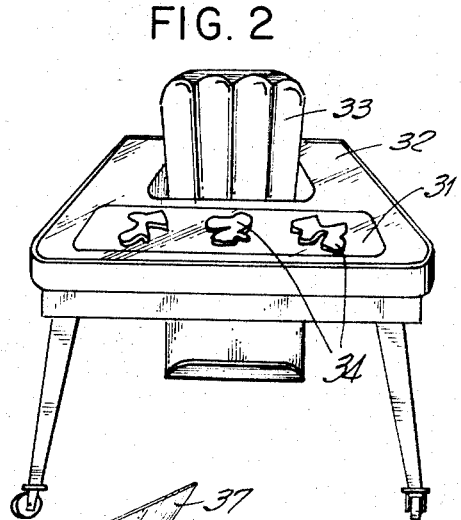
FIG. 2 is a perspective illustration of a child's table incorporating the invention.

FIG. 2 illustrates a magnetic board 31 mounted horizontally on a child's play table 32 containing a built-in child's seat 33. Cut-out figures 34 are magnetically fastened to the board 31.

Figure 3:
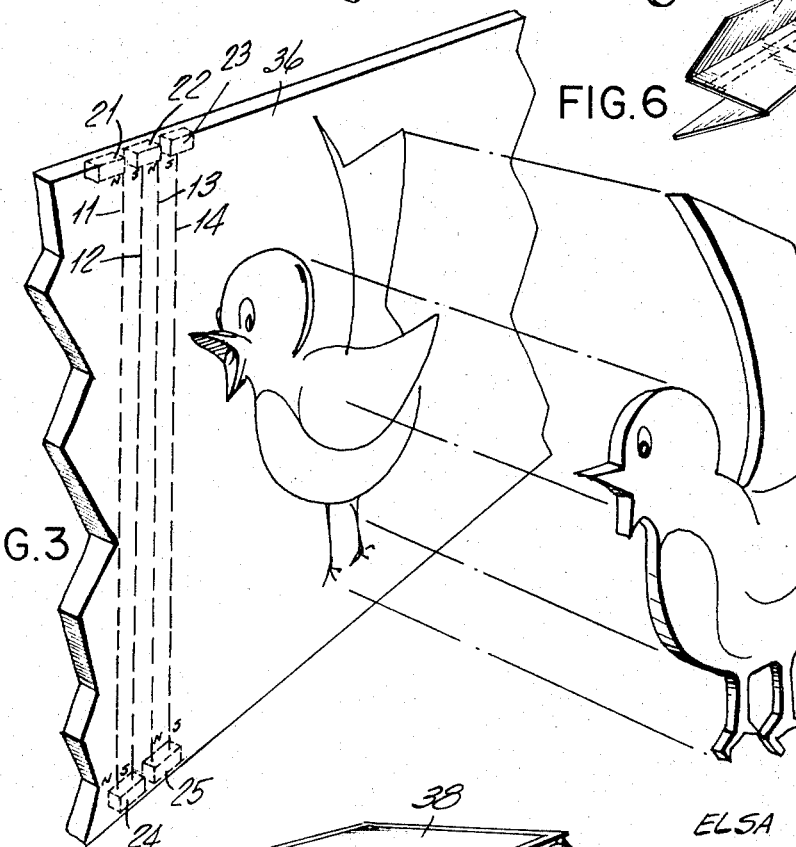
FIG. 3 is an illustration of a cut-out in the shape of a bird being attached to the magnetic board.
Figure 4:
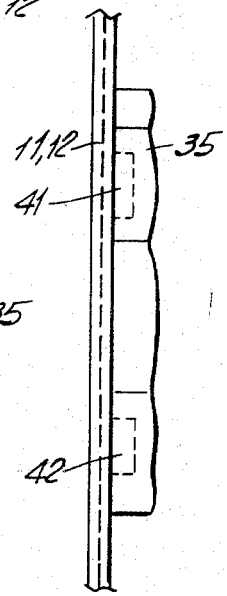
FIG. 4 is a fragmentary side view of the magnetic board.
Figure 5:
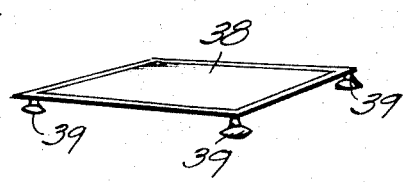
FIG. 5 is an isometric view of an alternate form of the magnetic board.

FIG. 3 illustrates a cut-out 35 in the shape of a bird about to be magnetically fastened to magnetic board 36. Parallel iron wires 11, 12, 13, 14 are embedded behind the non-ferrous board 36 with each wire terminating at the pole of magnets 21, 22, and 23 at one end of the wire and magnets 24 and 25 at the other end of the wire. Each embedded wire runs to the same pole of both magnets, wire 12 terminating in the South pole of magnets 22 and 24, with the adjacent wires 11 and 13 terminating in the North poles of their respective magnets, so as to maintain a magnetic force to attract any material of magnetic permeability such as iron or soft steel. The cut-out of the attached bird 35 has iron slugs 41 and 42 embedded in the back so as to be magnetically attracted to the board 36, as shown in FIG. 4.

Figure 6:
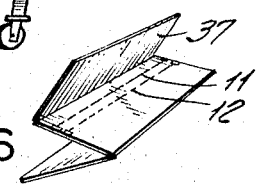
FIG. 6 is an isometric view of a foldable magnetic board.

The magnetic board may be formed in a foldable configuration 37 as shown in FIG. 6, or an alternate embodiment 38 may be fastened by attached suction cups 39 to any flat surface.

Since obvious changes may be made in the specific embodiment of the invention described herein without departing from the scope thereof, it is indicated that all matter contained herein is intended to be interpreted in an illustrative and not in a limiting sense.

Having thus described my invention, what I claim as new and desire to secure by Letters Patent of the United States is:

1. An educational toy for children consisting of a magnetized board which attracts and holds objects of iron or iron backing, consisting of a board of non-ferrous material in which parallel iron wires are embedded, said wires terminating at the poles of magnets, with each wire terminating at similar poles of magnet at each end of said wire, with both adjacent wires terminating at the corresponding opposite pole of a magnet, so as to create magnetic attraction between adjacent embedded wires and any object containing iron or other magnetic permeable material.

2. The device described in claim 1 together with shaped forms, which contain embedded sections of iron.

3. The device described in claim 2 in the form of a board mounted on a child's backboard.

4. The device described in claim 2 in the form of a board mounted on a child's playtable.

5. The device described in claim 2 mounted to flexible suction cups adaptable to fastening to a flat surface.

6. The device described in claim 2 with hinge sections parallel to said embedded wires so as to be adaptable to folding.

* * * * *